Sept. 20, 1960     R. W. BIRCH     2,953,073
CAMERA
Filed Sept. 27, 1955     4 Sheets-Sheet 1
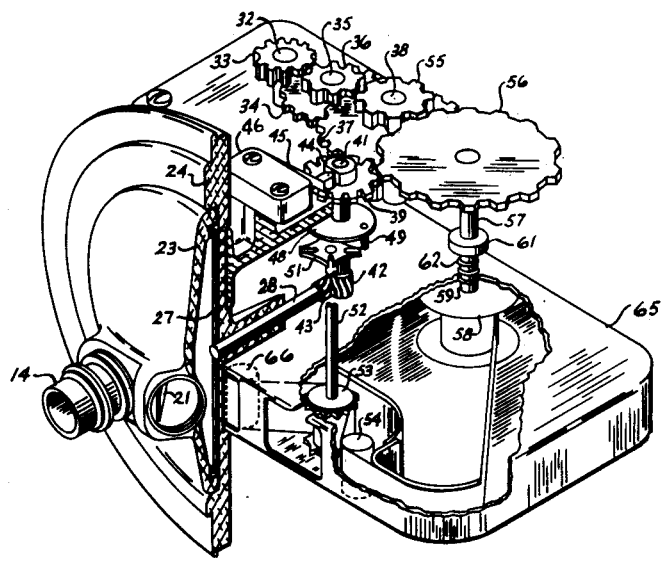
Fig_2
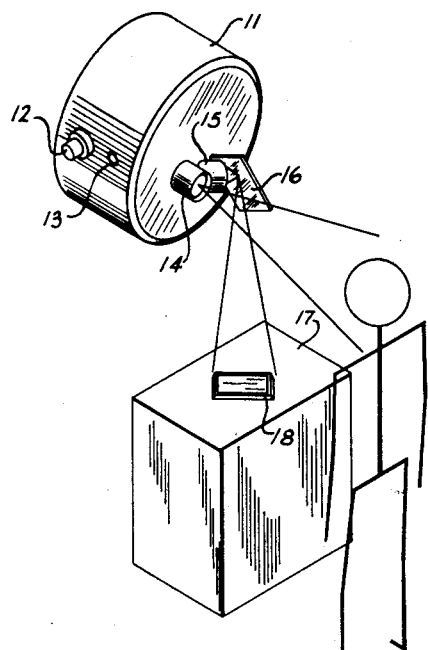
Fig_1
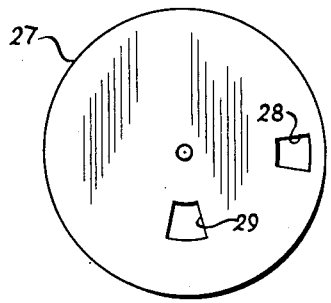
Fig_4
INVENTOR.
RICHARD W. BIRCH
BY
ATTORNEY Sept. 20, 1960  R. W. BIRCH  2,953,073
CAMERA
Filed Sept. 27, 1955  4 Sheets-Sheet 2
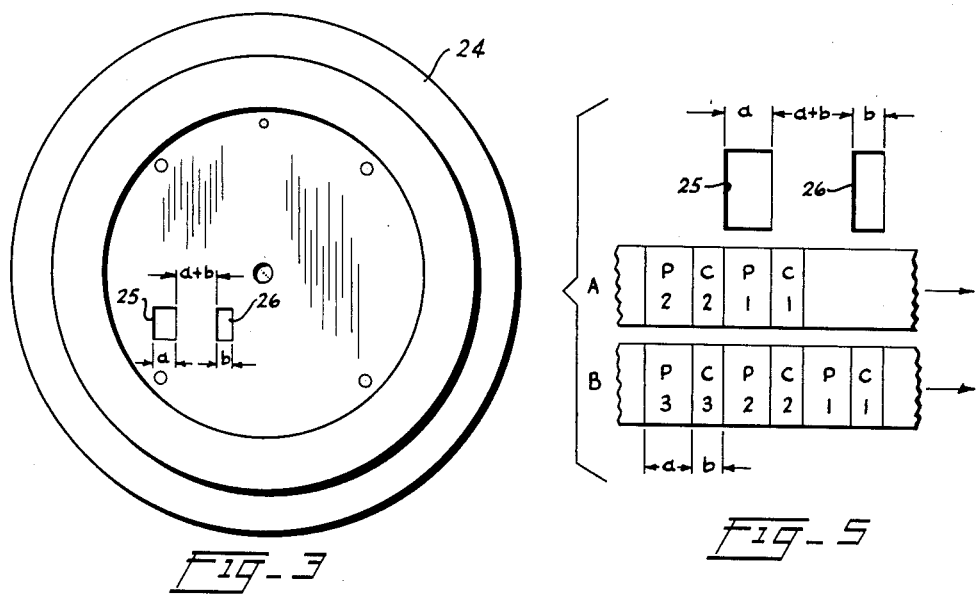
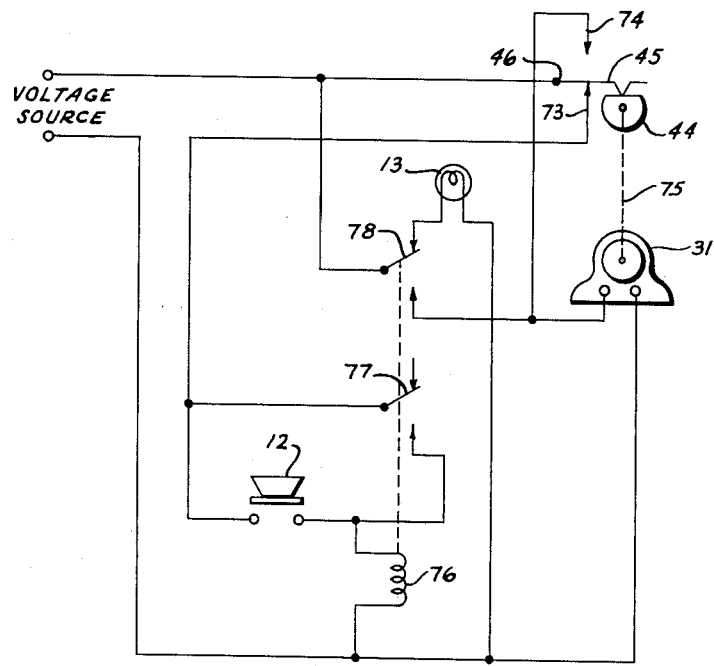
INVENTOR.
RICHARD W. BIRCH
BY
ATTORNEY

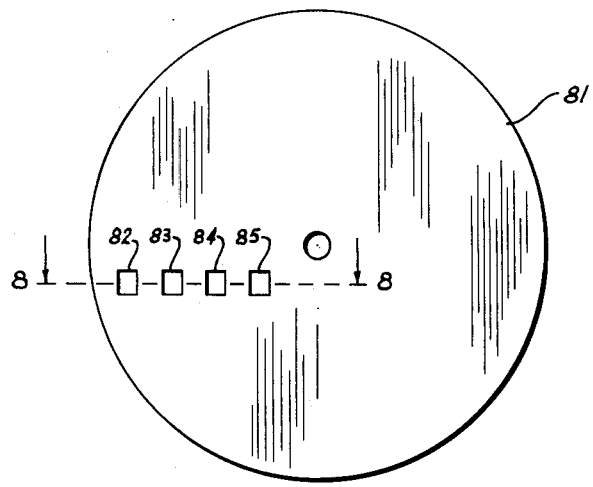
Fig_7
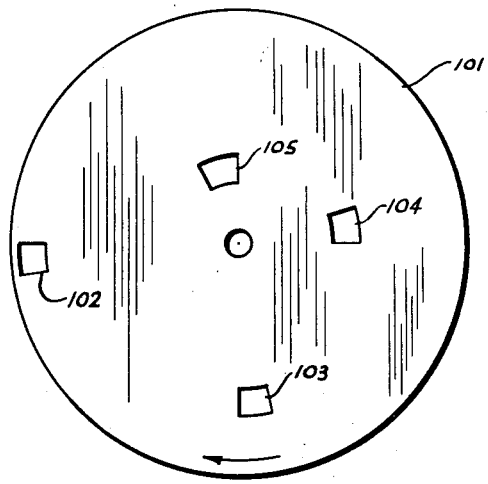
Fig_9
INVENTOR.
RICHARD W. BIRCH
ATTORNEY

Sept. 20, 1960  R. W. BIRCH  2,953,073
CAMERA
Filed Sept. 27, 1955  4 Sheets-Sheet 4
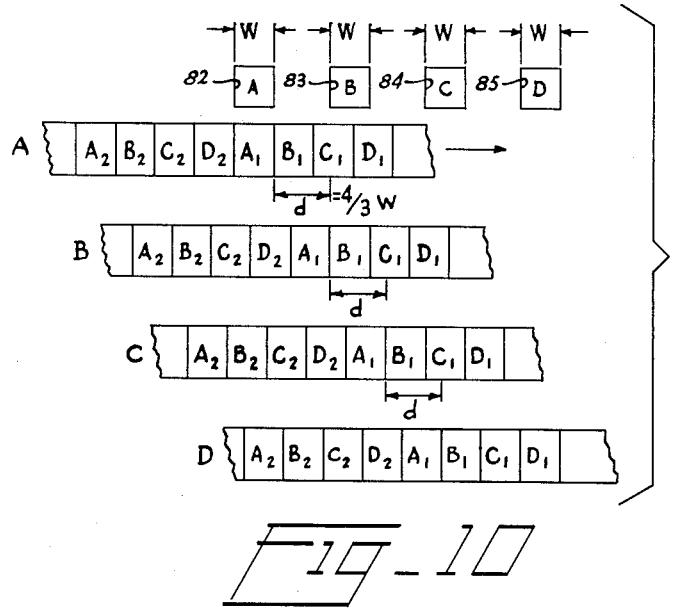
$$Fig\_10$$
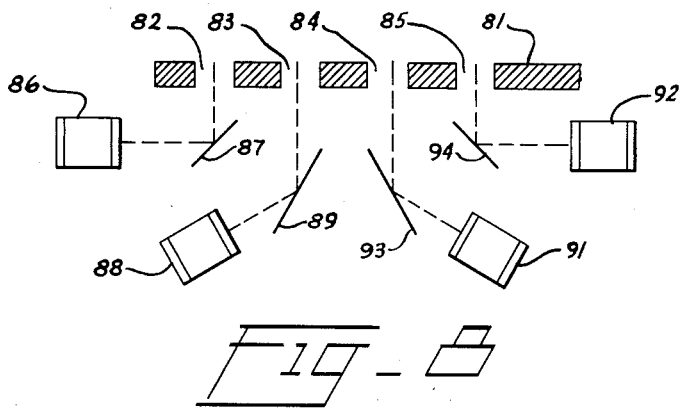
$$Fig\_8$$
INVENTOR.
RICHARD W. BIRCH
BY
ATTORNEY

United States Patent Office 2,953,073
Patented Sept. 20, 1960

2,953,073
CAMERA

Richard W. Birch, Carmel, N.Y., assignor to General Precision Inc., a corporation of Delaware Filed Sept. 27, 1955, Ser. No. 536,948

8 Claims. (Cl. 95—1.1)

This invention relates to a camera for making photographic records of several distinct fields of view on contiguous portions of a film.

Cameras for taking photographs of several objects simultaneously, or nearly simultaneously, have a number of useful applications. For example, many merchants have found it good business to cash checks for their patrons but in order to protect themselves they have found it advantageous to photograph both the customer and the check at the time of the transaction. Cameras have been constructed in the past to serve the needs of these merchants but have been subject to a number of disadvantages the reasons for which can be seen when the problem is considered.

The most convenient arrangement of subjects for the photography is to have the customer stand in front of a table or counter upon which the check is placed. Thus, unless the lens is moved between exposures, two lenses are required, and several different arrangements of two lenses have been proposed in the past to solve the problem. In one solution, the first lens is arranged in the conventional manner to record the portrait while the check lens is arranged at right angles to the first and a mirror employed to reflect the image onto an adjacent portion of the film. However, it is found that the optical elements interfere with the film advancing mechanism and with each other unless a special miniature check lens is used. Even so, this arrangement has been found impractical for use with film strips smaller than 35 mm. and utilizes this film inefficiently. Furthermore, the use of the mirror reverses the image of the check with respect to the portrait thus requiring a separate printing of the check image.

Other possible solutions include making the two exposures on separate film strips or on noncontiguous portions of the same film strip. However, neither of these solutions is entirely satisfactory since each makes it necessary to pair the portraits and the check photographs subsequently which is not only inconvenient but is also a source of possible error.

It is a general object of this invention to provide a camera for recording images from several distinct fields of view on contiguous portions of a film strip.

A more specific object is to provide a camera for recording images from two fields of view which employs standard, commercially available lenses.

Another object is to provide such a camera in which the images from the two fields of view are not reversed with respect to each other.

Another object is to provide a camera in which but a single manual operation is required to take a set of two photographs and to prepare the camera for taking another set.

In accordance with a specific embodiment of the invention, two lens systems are provided which form images of the objects in the plane of the film strip but displaced from each other lengthwise of the strip. A focal plane shutter and a film advancing mechanism are interconnected so that actuation of the camera exposes a section of film to the first image, advances the film, and exposes a contiguous section of film to the second image. The single film advancing operation pulls the film down the proper amount so as to position the film for both the second exposure of the first set and the first exposure of the next set.

For a clearer understanding of the invention, reference may be made to the following detailed description and the accompanying drawing, in which:

Figure 1 is a pictorial view showing a preferred embodiment of the invention in operating;

Figure 2 is an isometric view with portions cut away to show the operating mechanism;

Figures 3 and 4 are detail views of elements of the apparatus;

Figure 5 is a diagram useful in explaining the operation of the invention;

Figure 6 is a wiring diagram of the electrical connections;

Figure 7 is a view of the aperture plate of a second embodiment of the invention;

Figure 8 is a diagrammatic view showing the arrangement of lenses and mirrors used with the aperture plate of Fig. 7;

Figure 9 is a view of the rotary shutter of the second embodiment; and

Figure 10 is a diagram useful in explaining the operation of the second embodiment.

Referring first to Fig. 1, there is shown a general view of the camera in operation. The portion of the camera shown in Fig. 1 includes a housing 11, an operating button 12, a pilot light 13, portrait lens 14, a check lens 15 and a mirror 16. The camera may of course be supported by a suitable stand (not shown). In operation, the customer who wishes to cash a check stands in front of a table or counter 17 and places the check in a suitable receptacle 18. The light rays from the check are reflected by the mirror 16 into the lens 15. Passing through lens 15 the rays are reflected by another mirror 21 (shown in Fig. 2) and formed into image at the focal plane of the camera. The light rays from the customer's face pass directly to the lens 14 which forms an image thereof in the focal plane of the camera. When the customer and the check are in place, the operator pushes the button 12 which causes exposures to be made of both the customer's face and the check.

Figure 2 shows the operating mechanism of the camera. Certain portions, such as the cylindrical casing 11, the bearings for the various shafts and their supports and the check lens 15 have been omitted from Fig. 2 in order to show the remaining elements more clearly. A generally dome shaped member 23 supports the lenses 14 and 15 and the mirror 21. The member 23 is fastened to a generally circular plate 24 which serves as one end of the housing of the camera and also serves as an aperture plate. As shown in Fig. 3, the plate 24 contains two apertures 25 and 26 which are located directly behind the lens 14 and the mirror 21 respectively and allow the images formed by the lenses to reach the film.

Within the space formed by the dome shaped member 23 and in front of the aperture plate 24 is a rotary shutter 27 operated by a shaft 28 secured thereto. As shown in Fig. 4, the shutter 27 contains two openings 28 and 29 which cooperate with the apertures 25 and 26 respectively to expose the film to the two images when the shutter is rotated.

An electric motor 31, only the shaft 32 of which is visible in Fig. 2, is provided to operate the mechanism. A pinion 33 secured to the shaft 32 drives a gear 34 mounted on an idler shaft 35 to which is also fastened a pinion 36 which drives a gear 37 mounted on another idler shaft 38. The gear 37 drives a gear 39 mounted on a shaft 41 which shaft also carries a helical gear 42 which engages another helical gear 43 mounted on the shutter shaft 38. The shaft 41 also carries a cam 44 which cooperates with the operating lever 45 of a switch 46. When the lever is riding on the flat surface of the cam 44 one set of contacts are closed while when the lever is riding on the curved surface of the cam the first contacts are opened and another set of contacts are closed.

The shaft 41 also carries a pin wheel 48 which has mounted near one edge a pin 49. During a portion of each revolution of the shaft 41, the pin 49 engages one of the slots of a star wheel 51 mounted on a shaft 52 thereby rotating the shaft 52. This latter shaft carries a sprocket 53 which advances the film as will be more fully explained.

The shaft 38 also carries a pinion 55 which drives a gear 56 mounted on a shaft 57. A film takeup reel 58 is driven by its shaft 59 from the shaft 57 by means of a frictional drive shown as comprising a hub 61 fastened to the shaft 57 and to which hub is fastened a helical spring 62 which in turn is wound around the shaft 59. By this arrangement a small torque is placed on the shaft 59 whenever the motor rotates which is sufficient to take up any slack appearing in the film strip.

A film magazine is shown which comprises a light tight container 65 for the film. A storage reel of conventional construction may be provided in a portion of the container not shown in Fig. 2. The strip of film from this storage reel is guided by suitable rollers one of which is shown at 66 past the apertures 25 and 26 in the plate 24. The film strip then passes around the sprocket 53, an idler roller 54 and through a slot formed within the casing 65 to the takeup reel 58.

In operation, the starting button 12 is pressed momentarily which energizes the motor and causes the shafts 41 and 28 to rotate through approximately 360° and then to stop. The circuit connections for causing this rotation of 360° will be more fully explained in connection with Fig. 6. As the shaft 28 rotates, the shutter 27 rotates with it. As can best be seen by reference to Figs. 3 and 4, the opening 28 passes over the aperture 25 thereby exposing the image formed by the lens 14 to the film. When the opening 28 has passed the aperture 25, the pin 49 (Fig. 2) engages one of the slots of the star wheel 51 thereby rotating sprocket 53 and advancing the film. When the film has been advanced and the sprocket 53 has stopped turning, opening 29 in the shutter 27 passes over the aperture 26 in the plate 24 thereby impressing the image formed by the lens 15 on to the film. At the same time that the film is being advanced, the takeup reel 58 will rotate sufficiently to take up the slack in the film strip. After the opening 29 has passed the aperture 26 the switch 46 will cause the motor to be deenergized.

With this preliminary understanding of the apparatus the manner in which the advancing of the film between exposures permits pictures to be taken on contiguous portions of the film will now be explained. Referring to Fig. 3, the aperture 25 which allows the passage of the portrait image has a width lengthwise of the film strip of $a$ inches. The aperture 26 which allows passage of the image of the check may conveniently be made somewhat smaller, for example, $b$ inches. The distance between the apertures 25 and 26 is made equal to the sum of the widths of the two pictures, or $a+b$ inches. Each operation of the sprocket 53 advances the film by a distance equal to the separation between the apertures 25 and 26 or $a+b$ inches. In a specific embodiment constructed for use with 16 mm. film, $a$ was made 0.375 inch and $b$ 0.225 inch.

Figure 5 is a diagrammatic representation of the passage of the film strip past the apertures 25 and 26. The film strip is shown adjacent to, rather than in back of, the apertures 25 and 26 for convenience in explanation, and is shown divided into sections C1, P1, C2, P2, etc. upon which the various check and portrait exposures are to be made. The strip is shown at A with section P1 in registration with aperture 25 to receive the first portrait. After this exposure is made, by the passage of opening 28 of shutter 27 past the aperture 25, the strip is advanced to the position shown at B. The first portrait section P1 is now concealed but both the first check section, C1, and the second portrait section, P2, are in place for their exposure. The shutter 27 continues its rotation so that opening 29 passes over aperture 26 thereby making the first check exposure, and is then brought to rest. Both the film and the shutter are now in position for the next set of photographs.

Figure 6 shows the electrical connections of the apparatus. The motor 31 is mechanically connected as shown by the dashed line 75, to the cam 44 which cooperates with the switch lever 45. A source of voltage has one terminal connected to one terminal of the motor 31 and also to one terminal of a relay winding 76. The second terminal of the voltage source is connected to the armature of the switch 46 which has one contact 73 which is closed when the lever 45 is on the flat portion of the cam and another contact 74 which is closed when the lever 45 is on the cylindrical portion of the cam. The contact 73 is connected to one terminal of the push-button switch 12 and is also connected to the armature of a switch 77 operated by the relay winding 76. The second terminal of the voltage source is also connected to the armature of a second switch 78 also operated by the relay winding 76. The switches 77 and 78 are shown in their normal positions, that is, the positions occupied when the relay winding 76 is not energized. The normally closed contact of the switch 78 is connected to one terminal of the pilot light 13 the other terminal of which is connected to the first terminal of the voltage source. The normally open contact of the switch 78 is connected to the motor 31 and also to contact 74 of switch 46. The other terminal of relay winding 76 is connected to the normally open contact of switch 77 and also to one terminal of the push-button switch 12.

To operate the apparatus, it is only necessary that the push-button switch 12 be depressed momentarily. When this is done, current flows from the voltage source, through the contact 73 of switch 46, through the switch 12 to the relay winding 76 which is thereby energized and which operates the switches 77 and 78. The switch 77 forms a circuit around the switch 12 so that the winding 76 remains energized even if switch 12 is released. Operation of switch 78 allows current to flow directly from the source through the switch 78 to the motor 31. The motor therefore starts to rotate. When the lever 45 is raised by the action of cam 44, the circuit of the relay winding 76 is broken and the switches 77 and 78 revert to the position shown in the drawing. However, the motor continues to run since it is now energized through contact 74 of switch 46 and will continue to rotate until the cam 44 allows the lever 45 to break the motor circuit at which time the motor will coast to a halt. It will be noticed that when the apparatus is at rest in the position shown in Fig. 6, the pilot light 13 is energized through the switch 78 while when the apparatus is operating the switch 78 breaks the circuit to the lamp 13 thereby extinguishing it.

It can be seen that apparatus as above described comprises a compact, easily operated camera for taking two photographs. The interconnection of the camera and film advancing mechanism makes it possible to take the two photographs and prepare the camera for the next set simply by pushing a button. The important feature of advancing the film between exposures permits the formation of the two images on noncontigous portions of the focal plane, thereby allowing standard size, commercially available lenses to be used, and, at the same time, makes it possible to place the portrait and check records on contiguous sections of the film strip. The use of two plane mirrors doubly reverses the check image, thereby making the two recorded images of the same sense so that they may be printed simultaneously without turning the developed film over.

While the specific embodiment above described takes but two pictures, the invention is applicable to cameras for recording images from several fields of view. The camera of Fig. 2 could be modified by the addition of another lens similar to lens 15 on the other side of lens 14 so as to record three images. Four images may be recorded by the arrangement shown in Figs. 7–10.

Referring now to Fig. 7, there is shown an aperture plate 81, similar to the plate 24 of Figs. 2 and 3, containing four apertures 82, 83, 84, and 85 through which four images may pass to the focal plane of the camera. As shown in Fig. 8, light from a first field of view passes through a lens 86 and is then reflected by a mirror 87 through the aperture 82 to the focal plane. Similarly, light from a second field of view passes through a lens 88 and is then reflected by a mirror 89 to the focal plane. The lenses 91 and 92 and their associated mirrors 93 and 94 collect light from third and fourth fields of view which light passes through apertures 84 and 85 to the focal plane. Although Fig. 8 shows the optical axes of all the lenses lying in the same plane, it is obvious that the mirrors can be tilted so that the several fields of view may lie in various directions.

Referring now to Fig. 9, there is shown a rotary shutter 101, similar to the shutter 27 of Figs. 2 and 4, suitable for use with the aperture plate 81. The shutter contains four openings 102, 103, 104 and 105 which cooperate with apertures 82, 83, 84 and 85 respectively. The remainder of the camera may be similar to that shown in Fig. 2 except for the necessary changes in the film advancing mechanism.

In operation the button is pushed to start the motor and the shutter 101 rotates clockwise. Opening 102 first passes over aperture 82, making the first exposure. As the shutter rotates, the film is advanced (as will be more fully explained with the aid of Fig. 10), after which the opening 103 passes over the aperture 83 making the second exposure. The film is again advanced, the third exposure is taken as opening 104 passes over aperture 84, the film advanced the third and final time and the fourth exposure made as the opening 105 passes over the aperture 85. The motor is now deenergized and coasts to a stop. The stopping point is not critical it being necessary only that the shutter stop sometime after the fourth exposure is made and before the opening 102 reaches the aperture 82.

In the case of equal width apertures, it may be shown readily that the film should be advanced a distance $$d = \frac{NW}{N-1}$$

where N is the number of apertures and W is the width of each. In the case of four equal width apertures, as illustrated in Figs. 7, 8 and 9, $$d = \frac{4}{3}W$$

Referring now to Fig. 10, there are shown the four apertures 82, 83, 84 and 85, and below these there is shown diagrammatically four positions of a film strip. At A the film is shown in position for the A exposure of the first set. After this exposure is made, the film is advanced a distance $d=4/3\ W$ to the position shown at B, so that it is in position to make the B exposure of the first set. Similarly, the film is advanced between the B and C exposures and between the C and D exposures, but it is not advanced between the D exposure of one set and the A exposure of the next because as shown at D in Fig. 10, the same position of the film is proper for both the D exposure of one set and the A exposure of the next set.

When constructing a camera for taking more than two exposures, it is, of course, necessary to design the film advancing mechanism to make the proper number of exposures per revolution of the shutter and to provide for the proper periods of no advance during exposures and during the time the motor is coasting to a stop. The details of such mechanisms are not a part of the present invention and are well understood by those skilled in the art.

Figures 7–10 have illustrated apertures having equal widths, but unequal width apertures can also be accommodated. For example, in the case of four apertures, two of width L alternating with two of width M, then the film advance distance is equal to $$J = \frac{L+M+L+M}{N-1} = \frac{2(L+M)}{3}$$

and the distance between center lines of the unequal width apertures is $$K = J + \frac{L+M}{2}$$

The dimensions for other arrangements can be calculated in a similar manner.

Although a specific embodiment has been described in detail many modifications may be made within the scope of the invention. For example, an odd number of exposures could be made by placing an additional lens and mirror to the left of the lens 14 of Fig. 2 or by adding a lens, with or without a mirror, between the lenses 88 and 91 of Fig. 8. As another example, since very little power is required to actuate the camera it would be practical to arrange for manual operation, although at present the electric motor is preferred because of its simplicity. Many other modifications will occur to those skilled in the art.

What is claimed is:

1. A camera for automatically making a photographic record on contiguous portions of a film strip of a plurality of objects located in different directions from the camera comprising, a plurality of lenses each for forming an image of one of the objects, said images being formed in the same plane but displaced from each other, a shutter for successively exposing said images to a film strip, a film advancing mechanism, and actuating means interconnecting said shutter and said film advancing mechanism for operating said shutter and for advancing the film between exposures.

2. A camera comprising, means for holding a film strip in the focal plane, a fixed plate in front of said plane containing a plurality of apertures, a rotary shutter comprising a plate containing a plurality of openings each of which cooperates with one of said apertures, a plurality of optical systems each for forming an image of an object in said plane opposite one of said apertures, a mechanism for advancing the film strip a predetermined distance when actuated, and means interconnecting said shutter and said mechanism for passing the openings in said shutter past said apertures successively and for actuating said mechanism between exposures.

3. A camera comprising, a first optical system for forming a first image of a first object, a second optical system for forming a second image of a second object, said second image being in the same plane but displaced from said first image, a shutter cooperating with both of said optical systems, a film advancing mechanism, and actuating means interconnecting said shutter and said film advancing mechanism for sequentially exposing said first image, actuating said mechanism, and exposing said second image.

4. A camera comprising, a first optical system for forming a first image of a first object, a second optical system for forming a second image of a second object, said second image being in the same plane as said first image but displaced therefrom by a distance equal to the combined widths of said first and second images, a shutter cooperating with both of said optical systems, a mechanism for cyclically advancing a film by said distance, and actuating means interconnecting said shutter and said mechanism for successively exposing said first image, actuating said mechanism, and exposing said second image.

5. A camera comprising, means for holding a film strip in the focal plane, a fixed plate in front of said plane containing first and second apertures separated by a distance equal to the combined widths of said apertures, a rotary shutter comprising a plate containing first and second openings cooperating respectively with the two apertures in said fixed plate, a first optical system for forming a first image of a first object in said plane opposite said first aperture, a second optical system for forming a second image of a second object in said plane opposite said second aperture, a mechanism for advancing the film strip by said distance when actuated, and means interconnecting said shutter and said mechanism for successively passing said first opening past said first aperture, actuating said mechanism, and passing said second opening past said second aperture.

6. A camera comprising a first optical system for forming a first image of a first object, a second optical system for forming a second image of a second object, said second image being in the same plane but displaced from said first image, a shutter cooperating with both of said optical systems, a shaft for operating said shutter, an intermittent mechanism for advancing a film strip, a takeup reel, a main shaft operatively connected to said shutter shaft, said intermittent mechanism and said takeup reel, and means for automatically rotating said main shaft a predetermined amount, whereby the film strip is exposed to said first image, the film strip is advanced and stored on said reel, and the film strip is exposed to said second image.

7. A camera comprising, means for positioning a film strip in the focal plane, a fixed plate in front of said plane containing first and second apertures separated by a distance equal to the combined widths of said apertures, a rotary shutter comprising a plate containing first and second openings cooperating respectively with the two apertures in said fixed plate, a shutter shaft for operating said shutter, a first optical system for forming a first image of a first object in said plane opposite said first aperture, a second optical system for forming a second image of a second object in said plane opposite said second aperture, an intermittent mechanism for advancing the film strip by said distance when actuated, a takeup reel for storing exposed film, a main shaft operatively connected to said shutter shaft, said intermittent mechanism, and said takeup reel, and means for automatically rotating said main shaft a predetermined amount, whereby said first opening passes over said first aperture, said intermittent mechanism is actuated, the film is wound onto said reel, and said second opening passes over said second aperture.

8. A camera for taking photographs of two objects located in different directions from the camera, comprising, a first optical system in which the optical axis is a straight line from the object to the focal plane for forming an image of the first object, a second optical system including a first mirror, a lens and a second mirror for forming an image of the second object in the same focal plane but displaced from the image of the first object, a shutter having two apertures cooperating respectively with said first and second optical systems, a film advancing mechanism, and means interconnecting said shutter and said film advancing mechanism for successively exposing the image of said first object to said focal plane, actuating said mechanism, and exposing the image of said second object to said focal plane.

References Cited in the file of this patent

UNITED STATES PATENTS

| | | |
|---|---|---|
| 1,820,113 | Bettini | Aug. 25, 1931 |
| 2,125,388 | Monroe | Aug. 2, 1938 |
| 2,347,749 | Monroe | May 2, 1944 |
| 2,394,225 | Ashford | Feb. 5, 1946 |
| 2,420,046 | Loeb | May 6, 1947 |
| 2,742,834 | Kondolf | Apr. 24, 1956 |